United States Patent
Allman et al.

(10) Patent No.: US 7,657,080 B2
(45) Date of Patent: Feb. 2, 2010

(54) METHOD AND APPARATUS FOR PRODUCING AN IMAGE CONTAINING DEPTH INFORMATION

(75) Inventors: Brendan Edward Allman, East Brunswick (AU); Keith Nugent, North Fitzroy (AU)

(73) Assignee: Iatia Imaging Pty Ltd, Box Hill North Victoria (AU)

( * ) Notice: Subject to any disclaimer, the term of this patent is extended or adjusted under 35 U.S.C. 154(b) by 706 days.

(21) Appl. No.: 10/598,081

(22) PCT Filed: Feb. 18, 2005

(86) PCT No.: PCT/AU2005/000219

§ 371 (c)(1),
(2), (4) Date: Aug. 17, 2006

(87) PCT Pub. No.: WO2005/083377

PCT Pub. Date: Sep. 9, 2005

(65) Prior Publication Data

US 2007/0183647 A1    Aug. 9, 2007

(30) Foreign Application Priority Data

Mar. 1, 2004    (AU)    ................. 2004901081

(51) Int. Cl.
*G06K 9/00*    (2006.01)
(52) U.S. Cl. ..................... 382/154; 382/100; 382/216; 345/419
(58) Field of Classification Search .................. 382/154; 345/419–427
See application file for complete search history.

(56) References Cited

U.S. PATENT DOCUMENTS 6,072,903 A * 6/2000 Maki et al. .................. 382/190
6,222,938 B1 * 4/2001 Melen ......................... 382/154
6,480,620 B1 * 11/2002 Sakamoto .................... 382/154

FOREIGN PATENT DOCUMENTS

WO    WO 00/26622    5/2000
WO    WO 03/034010   4/2003

OTHER PUBLICATIONS

Simon et al., "Estimation of Depth on Thick Edges form Sharp and Blurred Images", Proc. IEEE Instrumentation and Measurement Technology Conference, 2002, pp. 323-328.

* cited by examiner

*Primary Examiner*—Bhavesh M Mehta
*Assistant Examiner*—Eric Rush
(74) *Attorney, Agent, or Firm*—Fish & Richardson P.C.

(57) ABSTRACT

Method and apparatus for producing an image containing depth information is provided. The method detects radiation emanating from a scene and forms at least two images of the scene at different planes. Each image contains a set of intensity data values. A variation of the data values is obtained so that two sets of intensity variances are obtained from the data values, and the intensity variance data is processed to obtain depth information. The depth information is coded so as to identify different depth information in the image data.

28 Claims, 6 Drawing Sheets

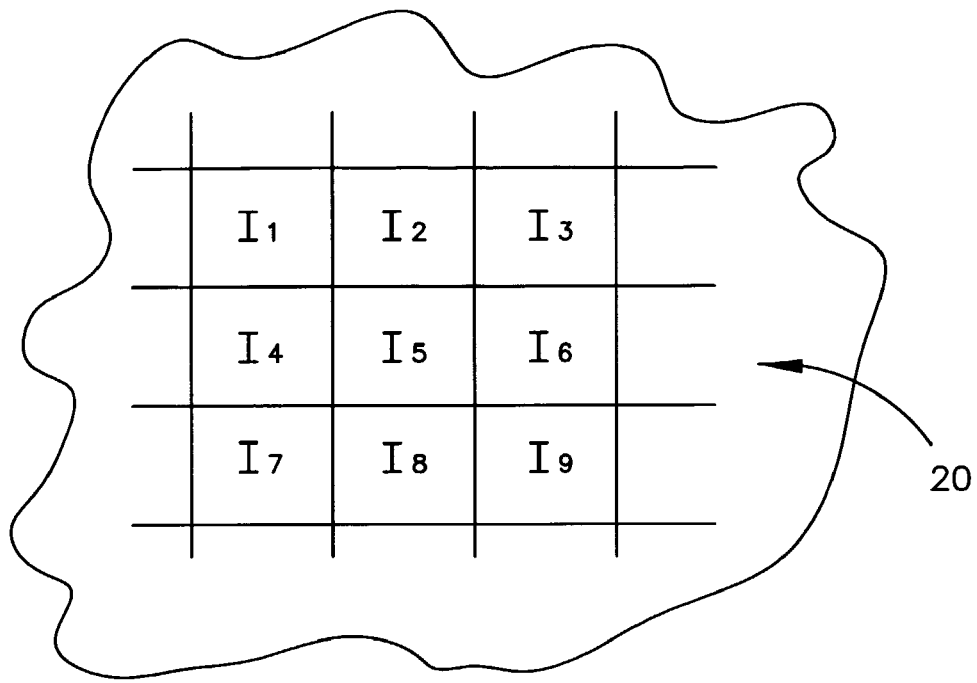
FIGURE 3
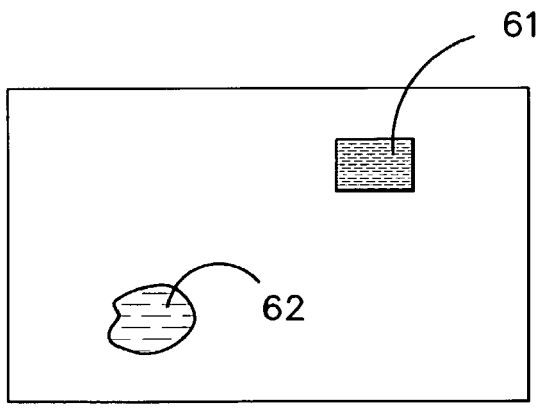
FIGURE 4
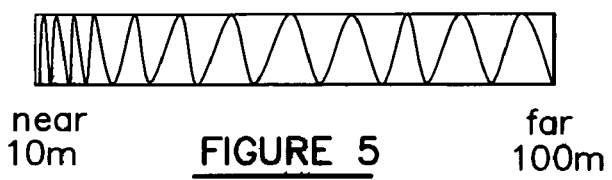
near
10m  FIGURE 5  far
100m

METHOD AND APPARATUS FOR PRODUCING AN IMAGE CONTAINING DEPTH INFORMATION

CROSS REFERENCE TO RELATED APPLICATION

This application is the National Stage of International Application No. PCT/AU2005/000219, filed on Feb. 18, 2005, which claims priority to Australian Patent Application Serial No. 2004901081, filed on Mar. 1, 2004. The contents of these applications are hereby incorporated by reference in their entireties.

FIELD OF THE INVENTION

This invention relates to a method and apparatus for producing an image containing depth information. The invention has particular application to thermal images in the 8 to 12 micron band of the electromagnetic spectrum. However, the method and apparatus is also useful with images taken in other parts of the electromagnetic spectrum (and in particular visible light), as well as electron beam images, and other forms of particle radiation images as well as acoustic images.

BACKGROUND ART

Thermal images are used to produce a visual image of a scene in darkness. In such images, articles in the scene which are above ambient temperature can be easily visualised. However, one major difficulty with conventional thermal images is that the images contain little or no depth information, so that it is very difficult to ascertain whether one part of the image is in front of or behind another part of the image. Thus, when a thermal image is taken of a scene which, for example, may contain people, the thermal image will clearly show each of the individual people, but will not provide sufficient information to ascertain the relative positions of the people in space.

In many applications, it is necessary that the image does include depth information so that the image provides sufficient information of the scene to suit a particular purpose.

SUMMARY OF THE INVENTION

The object of the invention is to provide a method and apparatus of producing images containing improved depth information so that a determination can be made as to the distance of various parts of the image relative to one another and from the location where the image is taken.

The invention may be said to reside in a method of producing an image containing depth information, comprising:

detecting a radiation wavefield emanating from the scene and taking at least two images of the scene at different planes relative to the scene to produce a first image comprised of a first set of intensity data values and a second image comprised of a second set of intensity data values;

determining an intensity variation of data values in the first set of data values relative to other data values in the first set of data values to produce a first set of intensity variances, and determining an intensity variation of data values in the second set of values relative to other data values in the second set of values to produce a second set of intensity variance data;

processing the first and second sets of intensity variance data to obtain image data of the scene containing depth information; and coding the image data which have the same depth information with a code reference to identify the different depth information in the image data.

Thus, by producing the variance data and then processing the variance data, the variance data is able to result in the production of depth information in the image which can then be coded so that the different depth information is apparent in the image.

In the preferred embodiment of the invention, the intensity variance data is processed in accordance with the phase image production method disclosed in our co-pending International Patent Application Nos. PCT/AU99/00949 and PCT/AU02/01398. The contents of these two International applications are incorporated into this specification by this reference.

Thus, the step of processing the intensity variance data preferably comprises:

(a) producing a representative measure of the rate of change of variance data values of said radiation wave field over a selected surface extending generally across the wave field;

(b) producing a representative measure of said radiation wave field relating to the scene over said selected surface;

(c) transforming said measure of rate of change of variance to produce a first integral transform representation and applying to said first integral transform representation a first filter corresponding to the inversion of a first differential operator reflected in said measure of rate of change of variance to produce a first modified integral transform representation;

(d) applying an inverse of said first integral transform to said first modified integral transform representation to produce an untransformed representation;

(e) applying a correction based on said measure over said selected surface to said untransformed representation;

(f) transforming the corrected untransformed representation to produce a second integral transform representation and applying to said second integral transform representation a second filter corresponding to the inversion of a second differential operator reflected in the corrected untransformed representation to produce a second modified integral transform representation;

(g) applying an inverse of said second integral transform to said second modified integral transform representation to produce a measure of phase of said radiation wave field across said selected plane so as to produce said image data as phase image data containing the depth information.

The step of producing a representative measure of said radiation wavefield relating to the scene over the selected surface may use intensity values to obtain the representative measure or variance values.

In particular, in one embodiment, intensity values at the selected surface are used.

In another embodiment, values are taken representing maximum focus from any of the intensity data values.

In another embodiment, variance data values are used as a representative measure.

In a still further embodiment, maximum variance values taken from the sets of variance data values are used.

Preferably at least one of the first or second differential operator has a form based on an optical system used to acquire the radiation for producing the representative measure of the rate of change of variance of the radiation wavefield over the selected surface extending generally across the wavefield.

Preferably both the first and second differential operators have a form based on the optical system.

Preferably the first and second integral transforms are produced using a Fourier transform.

In one embodiment of the invention the differential operators have the form:

$$\frac{\sqrt{T_P}}{T_P + \alpha^2}$$

where, $$T_P(\rho) = 2\pi i \delta z \int \eta T_P^{(3)}(\rho, \eta) d\eta$$

and $$T_P^{(3)}(\rho, \eta) = \frac{i}{2\pi\rho} \left\{ \begin{array}{c} \left[ \frac{1}{2}\rho_{obj}^2(\xi^2+1) - \frac{1}{4}\rho^2 - \left(\frac{\eta}{\lambda\rho}\right)^2 - \right]^{1/2} \\ \left|\frac{\eta}{\lambda} - \frac{1}{2}\rho_{obj}^2(\xi^2-1)\right| \\ - \left[ \frac{1}{2}\rho_{obj}^2(\xi^2+1) - \frac{1}{4}\rho^2 - \left(\frac{\eta}{\lambda\rho}\right)^2 - \right]^{1/2} \\ \left|\frac{\eta}{\lambda} + \frac{1}{2}\rho_{obj}^2(\xi^2-1)\right| \end{array} \right\}$$

and wherein ρ is radial lateral spatial frequency, the η longitudinal spatial frequency and δz is the defocus distance in the plane of the object. Also $$\xi = \frac{NA_{condensor}}{NA_{objective}}$$

where $NA_{condensor}$ and $NA_{objective}$ are respectively the numerical aperture of the condenser and the objective (These are settings and dimensions on the microscope). $\rho_{obj}$ is the maximum spatial frequency accepted by the objective.

Preferably the step of taking at least two images of a scene comprises taking the first image at a first defocused plane to produce the first image as negatively focused image data and taking the second image of the scene at a second defocused plane to produce positive defocused image data, the negative and positive defocused image being taken on respective sides of a focal plane which would produce an in focus image of the scene.

Preferably the step of determining an intensity variance comprises determining a measure of the sharpness of each of the data values relative to the sharpness of data values surrounding that data value.

In the preferred embodiment of the invention the images are captured by a charge coupled device and an intensity value of pixels in the image is determined, and that intensity value is compared with the intensity of surrounding pixels in order to provide a variance value at each pixel.

Preferably the variance is obtained by the following equation for each pixel:

$$\text{var.}_n = \frac{1}{8} \times \sqrt{\begin{array}{c}(I_n - I_2)^2 + (I_n - I_4)^2 + (I_n - I_8)^2 + \\ (I_n - I_6)^2 + \frac{1}{\sqrt{2}}(I_n - I_1)^2 + \frac{1}{\sqrt{2}}(I_n - I_3)^2 + \\ \frac{1}{\sqrt{2}}(I_n - I_7)^2 + \frac{1}{\sqrt{2}}(I_n - I_9)^2 \end{array}}$$

wherein n is the particular pixel, and the values 1 to 9 represent the pixels which surround that pixel in an array of pixels.

Thus, in this embodiment, each pixel is compared with pixels which immediately surround the particular pixel in order to determine the variance. In other embodiments, each pixel could be compared with the pixels which surround that pixel, together with the pixels which surround the pixel and are one further pixel away and so on. The variance could also be determined by other methods so that a variance of each pixel relative to the other pixels in each data set is obtained.

Preferably the step of coding parts of the image data comprises applying different colours to parts of the image which have the same depth information so as to produce a visual image in which the relative distance of parts of the scene compared to one another can be determined.

Preferably a third image of the scene is taken at an in focus plane to produce a third set of intensity data values and the third set of intensity data values are overlaid with the coded image data to produce a visual image containing structural information of the scene as well as the different depth information in the scene.

However, in other embodiments, rather than providing a visual image, the image could be an electronic image stored in a computer, and the code reference could simply be a code value allocated by the computer to the different depth information so that if images at a particular location are required, information as to those parts of the image can be extracted by the computer by the code reference.

Preferably the different depth information is provided by allocated a grey scale value to pixel values in the image.

The invention may also be said to reside in a computer program for performing the above-mentioned method.

The invention may also be said to reside in an apparatus for producing an image containing depth information comprising:
  a camera for detecting a radiation wavefield emanating from a scene and taking at least two images of the scene at different planes relative to the scene to produce a first set of intensity data values and a second set of intensity data values;
  a processor for determining an intensity variation of data values in the first set of data values compared to other data values in the first set of data values to produce a first set of variance data values, and for determining a variance of one data value in the second set of data values compared to other data values in the second set of data values to produce a second set of variance data values;
  the processor also being for processing the first and second variance data values to produce image data of the scene containing depth information; and
  the processor also being for coding parts of the image which have the same depth information with a code reference to identify the different depth information in the image.

Thus, the processor for determining an intensity variation is a processor for:

(a) producing a representative measure of the rate of change of variance data values of said radiation wave field over a selected surface extending generally across the wave field;

(b) producing a representative measure of said radiation wave field relating to the scene over said selected surface;

(c) transforming said measure of rate of change of variance to produce a first integral transform representation and applying to said first integral transform representation a first filter corresponding to the inversion of a first differential operator reflected in said measure of rate of change of variance to produce a first modified integral transform representation;

(d) applying an inverse of said first integral transform to said first modified integral transform representation to produce an untransformed representation;

(e) applying a correction based on said measure over said selected surface to said untransformed representation;

(f) transforming the corrected untransformed representation to produce a second integral transform representation and applying to said second integral transform representation a second filter corresponding to the inversion of a second differential operator reflected in the corrected untransformed representation to produce a second modified integral transform representation;

(g) applying an inverse of said second integral transform to said second modified integral transform representation to produce a measure of phase of said radiation wave field across said selected plane so as to produce said image data as phase image data containing the depth information.

The step of producing a representative measure of said radiation wavefield relating to the scene over the selected surface may use intensity values to obtain the representative measure or variance values.

In particular, in one embodiment, intensity values at the selected surface are used.

In another embodiment, values are taken representing maximum focus from any of the intensity data values.

In another embodiment, variance data values are used as a representative measure.

In a still further embodiment, maximum variance values taken from the sets of variance data values are used.

Preferably at least one of the first or second differential operator has a form based on an optical system used to acquire the radiation for producing the representative measure of the rate of change of variance of the radiation wavefield over the selected surface extending generally across the wavefield.

Preferably both the first and second differential operators have a form based on the optical system.

Preferably the first and second integral transforms are produced using a Fourier transform.

In one embodiment of the invention the differential operators have the form:

$$\frac{\sqrt{T_P}}{T_P + \alpha^2}$$

where, $$T_P(\rho) = 2\pi i \delta z \int \eta T_P^{(3)}(\rho, \eta) d\eta$$

and $$T_P^{(3)}(\rho, \eta) = \frac{i}{2\pi\rho} \left\{ \begin{array}{c} \left[ \frac{1}{2}\rho_{obj}^2(\xi^2 + 1) - \frac{1}{4}\rho^2 - \left(\frac{\eta}{\lambda\rho}\right)^2 - \right]^{1/2} \\ \left| \frac{\eta}{\lambda} - \frac{1}{2}\rho_{obj}^2(\xi^2 - 1) \right| \\ \left[ \frac{1}{2}\rho_{obj}^2(\xi^2 + 1) - \frac{1}{4}\rho^2 - \left(\frac{\eta}{\lambda\rho}\right)^2 - \right]^{1/2} \\ - \left| \frac{\eta}{\lambda} + \frac{1}{2}\rho_{obj}^2(\xi^2 - 1) \right| \end{array} \right\}$$

and wherein $\rho$ is radial lateral spatial frequency, the $\eta$ longitudinal spatial frequency and $\delta z$ is the defocus distance in the plane of the object. Also $$\xi = \frac{NA_{condensor}}{NA_{objective}}$$

where $NA_{condensor}$ and $NA_{objective}$ are respectively the numerical aperture of the condenser and the objective (These are settings and dimensions on a microscope, if a microscope is used in the capture of the various images by camera). $\rho_{obj}$ is the maximum spatial frequency accepted by the objective.

If images are captured through a different optical system such as a telescope or simply by the optics of a camera, then the above operators are modified to suit the various optics of that system.

Preferably the step of taking at least two images of a scene comprises taking a first image at a first defocused plane to produce a negatively focused image and taking a second image of the scene at a second defocused plane to produce a positive defocused image, the negative and positive defocused image being taken on respective sides of a focal plane which would produce an in focus image of the scene.

Preferably the step of determining an intensity variance comprises determining a measure of the sharpness of each of the data values relative to the sharpness of data values surrounding that data value.

In the preferred embodiment of the invention the images are captured by a charge coupled device and an intensity value of pixels in the image is determined, and that intensity value is compared with the intensity of surrounding pixels in order to provide a variance at each pixel.

Preferably the variance is obtained by the following equation for each pixel:

$$\text{var.}_n = \frac{1}{8} \times \sqrt{\begin{array}{c}(I_n - I_2)^2 + (I_n - I_4)^2 + (I_n - I_8)^2 + \\ (I_n - I_6)^2 + \frac{1}{\sqrt{2}}(I_n - I_1)^2 + \frac{1}{\sqrt{2}}(I_n - I_3)^2 + \\ \frac{1}{\sqrt{2}}(I_n - I_7)^2 + \frac{1}{\sqrt{2}}(I_n - I_9)^2\end{array}}$$

wherein n is the particular pixel, and the values 1 to 9 represent the pixels which surround that pixel in an array of pixels and I is the intensity value of the respective pixel.

Preferably the step of coding parts of the processed image comprises applying different colours to parts of the image which have the same depth information so as to produce a visual image in which the relative distance of parts of the scene compared to one another can be determined.

However, in other embodiments, rather than providing a visual image, the image could be an electronic image stored in a computer, and the code reference could simply be a code value allocated by the computer to the different depth information so that if images at a particular location are required, information as to those parts of the image can be extracted by the computer by reference to the code reference.

Preferably the different depth information is provided by allocated a grey scale value to pixel values in the image.

BRIEF DESCRIPTION OF THE DRAWINGS

A preferred embodiment of the invention will be described with reference to the accompanying drawings in which:

FIG. 3 is a diagram showing pixels of a camera used to take the images in the preferred embodiment of the invention;

FIG. 4 is a diagram illustrating the production of different depth information;

FIG. 5 is a diagram illustrating how different depth information is coded according to the preferred embodiment of the invention;

DETAILED DESCRIPTION OF THE PREFERRED EMBODIMENT

The preferred embodiment of the invention effectively processes images in accordance with the phase determination technique disclosed in our International Applications PCT/AU99/00949 and PCT/AU02/01398. However, before the algorithm disclosed in these applications is used to process the data relating to the captured scenes to produce the image, the data is first manipulated so as to produce a variance data so the variance data is processed in accordance with the algorithms rather than pure intensity data, as disclosed in the above International applications. However, apart from this, the method of processing the data is the same as that disclosed in the above International applications.

Figure 1:
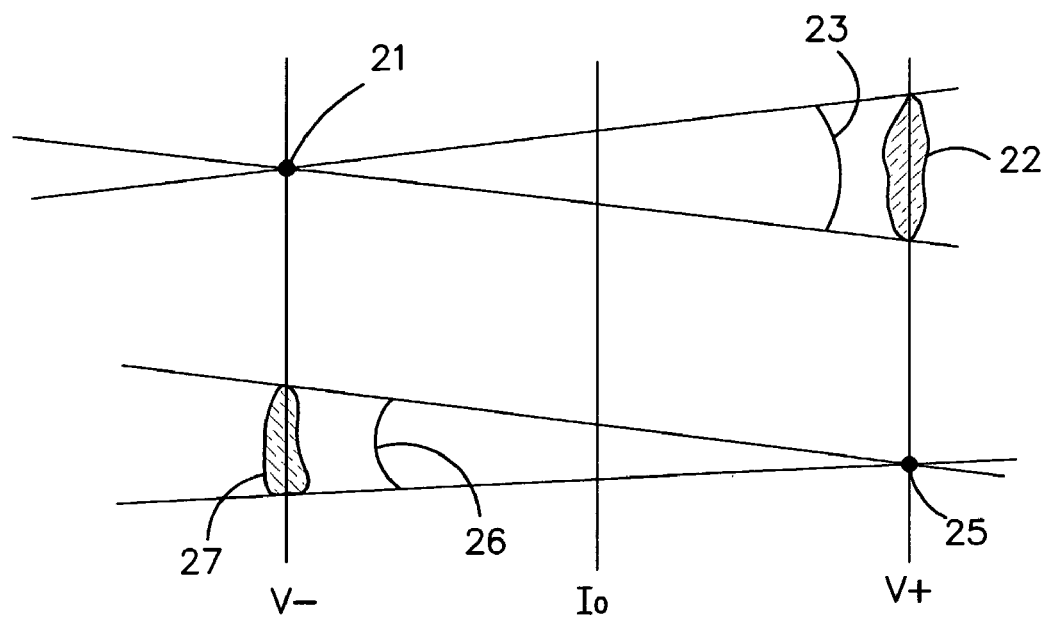
FIG. 1 is a diagram to assist in illustrating the preferred embodiment of the invention.

FIG. 1 is a diagram showing an image of a scene at three different focal planes. The plane $I_0$ is an in focus plane which will be used to capture an in focus image of the scene. The scene may include a number of articles or objects such as vehicles, personnel, or the like, and in general, the preferred embodiment of the invention is to be used for obtaining thermal images. However, the invention could be used with other types of images and improve the depth information in those images. The invention has particular application to thermal images because thermal images generally contain little or no depth information which enables different parts of the images to be compared in terms of distance with other parts of the image. Thus, in thermal images, it is very difficult to ascertain whether one part of the image is closer to or further away from the location from where the images were captured, or where parts of the image are located in space relative to one another.

The plane $V_-$ is a negatively defocused plane within the depth of field of the camera 20 (see FIG. 2) used to capture the images, the plane $I_0$ is the focal plane, and the plane $V_+$ is a positively defocused plane also within the depth of field of the camera 20, but positively defocused relative to the plane $I_0$. In other words, the plane $V_-$ is closer to the scene than the in focus plane $I_0$ and the plane $V_+$ is further away from the scene than the in focus plane $I_0$.

Typically, parts of the image taken at the plane $V_-$ which happen to be in focus t the plane $V_-$ will produce a very sharp image point 21 at the plane $V_-$, but will be a very fuzzy defocused image at the plane $V_+$ as shown by reference 22. The waveform which produces the images at 21 and 22 is shown at 23 in FIG. 1. Similarly, part of the image 24 which is defocused and blurry at the plane $V_-$ may be focused at the plane $V_+$ as represented by reference 25. Once again, the form of the wavefield producing these parts of the images is shown at 26.

Figure 2:
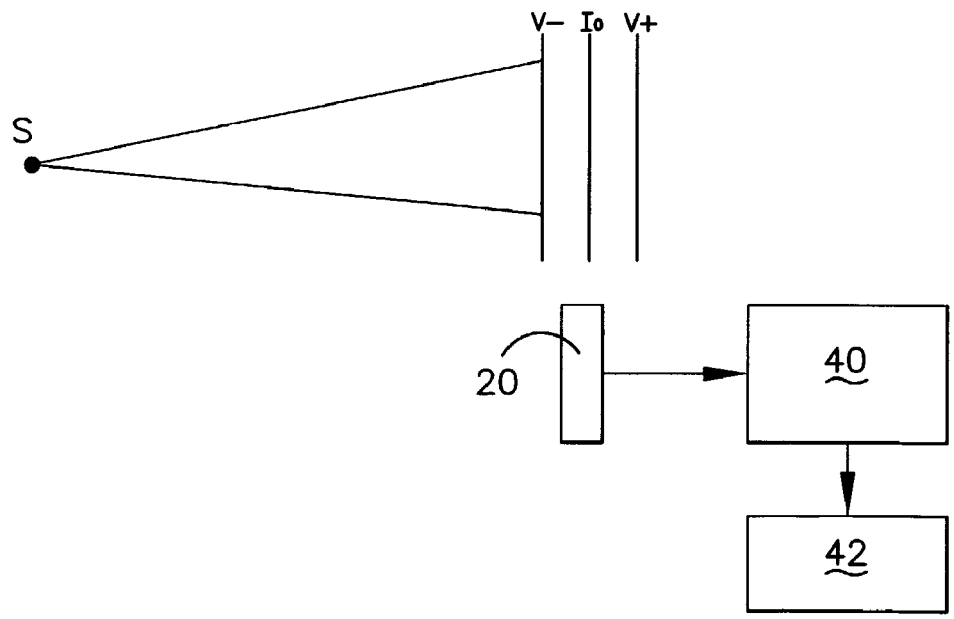
FIG. 2 is a view of an apparatus embodying the invention.

As is shown in FIG. 2, the camera 20 is used to capture images of the scene schematically shown at S in FIG. 2 at the planes $V_-$, $I_0$ and $V_+$ so that three sets of intensity data at those three planes is captured by the pixels of the camera 20.

In the preferred embodiment of the invention, the camera 20 is a cryogenically-cooled, 640×480 pixel array thermal camera operating in the 8 to 12 micron band with adjustable-focus Ge lens. The intensity data captured by the camera 20 is processed in a processor 40 and images may be displayed on a display 42.

The processor 40 first determines a variance value for each of the pixels for each of the two images at the planes $V_-$ and $V_+$. Thus, two sets of variance data is therefore produced.

FIG. 3 shows an example of nine pixels of the pixel array forming camera 20 and the variance at the pixel $I_5$ is determined in accordance with the following equation:

$$\text{var.}_5 = \frac{1}{8} \times \sqrt{\begin{array}{l}(I_5 - I_2)^2 + (I_5 - I_4)^2 + (I_5 - I_8)^2 + \\ (I_5 - I_6)^2 + \frac{1}{\sqrt{2}}(I_5 - I_1)^2 + \frac{1}{\sqrt{2}}(I_5 - I_3)^2 + \\ \frac{1}{\sqrt{2}}(I_5 - I_7)^2 + \frac{1}{\sqrt{2}}(I_5 - I_9)^2\end{array}}$$

Thus, a variance value for the fifth pixel in the array of FIG. 3 is determined. In FIG. 3, pixels which are arranged at the edge of the array can be set to a value 0 so that they are not included in the calculations. This reduces the size of the image slightly by 2 pixel widths. However, it makes calculation much easier because all of the variances can be determined in the above mentioned manner because all pixels will then be surrounded by 8 other pixels. Similarly, variance values for each of the other pixels in the array is determined for each of the image pixels of planes $V_-$ and $V_+$ so that two sets of variance data is produced. The two sets of variance data is then used in the algorithm to produce the phase image data of the scene instead of the pure intensity data originally captured by the camera 20. The use of the variance data provides a measure of the sharpness of the image at each of the planes $V_-$ and $V_+$ and therefore, inherently includes a measure of the depth of parts of the image relative to other parts of the image. The variance data is then processed in the same manner as the intensity data, as disclosed in the aforementioned International applications, so as to produce a phase image of the scene in which depth of field information is included. Because the variance data is used to produce the phase image, the image will contain very little detail of the actual structure of articles or things in the scene, but will contain general outlines showing features of the scene. The depth of position information in the processed image can be given by a grey scale value at each of the pixels in the processed image data, which in turn therefore provide a relative measure of the part of the scene which relates to each pixel relative to other parts of the scene, as well as relative to the position of parts of the scene from where the images were taken. For example, as is best shown in FIG. 4, something which is very close to where the image is taken appears darker, as shown by reference 61, and something which is further away appears much lighter as at 62.

The grey scale values allocated to each of the pixels in the processed phase image can be used to provide an actual measure of the distance of the parts of the scene from where the image was taken and relative to one another. For example, if the optics of the camera is known and the distance between the planes $V_1$ and $V_+$ is also known, actual measurement values can be associated with various grey scale values in the image to provide a distance measure of parts of the scene relative to one another, and also from where the images were taken.

The image shown in FIG. 4 can then be coded so as to more clearly bring out the different distances of articles in the image by applying a code reference to parts of the image which have the same grey scale value. This can be done in a variety of different ways, but most preferably is performed by coding parts of the image with a false colour palette so that parts of the image which have the same grey scale value are coloured with the same colour. This therefore makes it very much easier to perceive depth information in the image than in the mere conventional thermal image in which the entire image appears to be approximately the same shade. For instance, in FIG. 5, the grey scale values are shown for near articles in the image which may be say 10 metres from where the image is taken, up to 100 metres away. Those grey scale values can be allocated with different colours in the manner referred to above, so that a particular colour can be associated with a particular distance in the image to make it therefore much more easy to perceive where articles in the image are actually located relative to one another.

In order to produce an image in which the details of the article are shown, rather than the pure distance information, the processed image can then be applied to the intensity image taken at plane $I_0$ which is the in focus plane, to give both the intensity information of the image and the depth information of the image in the one image. Thus, the intensity information provides the structural detail of the various components in the image and the depth information, as previously described, enables you to ascertain the relative position of parts of the image. Thus, this image will not only contain the depth information, but will also make it much easier to ascertain what various components of the image are, because the actual structure in the image will be seen.

Thus, according to the preferred embodiment of the invention, the imaging range of the lens on the camera 20 and the colour rendering can be calibrated and therefore positions of the image can be quantified. This technique then offers the opportunity to provide a passive ranging capability. In conditions of near thermal uniformity, where there is very little contrast in the field of view, the depth positional information provided by this process suggests another contrast mechanism for viewing and processing images of scenes. Finally, under obscured viewing conditions, such as under camouflage, the outline of an object can be disrupted, making iden-tification difficult. The colour depth rendering of the scene allows the piecing together of image components at common positions, as even though the outlines can be disguised, the physical positions in space cannot be.

The manner in which the algorithm operates to process the variance data to produce the phase image is described below.

At each point in space, an optical beam possesses two properties: intensity and phase. Intensity is a measure of the amount of energy flowing through each point, while phase gives a measure of the direction of the energy flow.

Intensity may be measured directly, for example by recording an image on film. Phase is typically measured using interference with a "reference beam". In contrast the present method gives a non-interferometric method for measuring phase.

Intensity can be measured over two parallel planes $V_-$, $V_+$ extending across the direction of propagation of the wave field on the side remote from the incident radiation.

The present invention determines phase by providing a solution to the transport-of-intensity equation:

$$\nabla_\perp \cdot (I \nabla_\perp \phi) = -k \frac{\partial I}{\partial z} \quad (1)$$

where I is the intensity in the plane, the gradient operator in the plane is denoted $\nabla_\perp$, k is the wave number of the radiation, and $\partial I/\partial z$ is the intensity derivative or rate of change of intensity. However, in order to obtain the depth information which is previously referred to, rather than using the intensity values which are obtained by the camera at the two planes, the variance values calculated in the above mentioned manner are obtained so that a variance derivative, or rate of change of variance $\partial V/\partial z$. Note that $\partial V/\partial z$ is estimated from the difference of the measurements in the planes $V_-$ and $V_+$ shown in FIG. 1, while the intensity I is given by the average of the measurements.

In order to obtain a solution to equation 1 the function A is first defined as:

$$\nabla_\perp A = I \nabla_\perp \phi. \quad (2)$$

Thus equation (1) becomes:

$$\nabla_\perp \cdot (\nabla_\perp A) = -k \partial_z V. \quad (3)$$

Making use of a standard identity $\nabla_\perp \cdot \nabla_\perp = \nabla_\perp^2$, this may be written:

$$\nabla_\perp^2 A = -k \partial_z V \quad (4)$$

where $\nabla_\perp^2$ denotes the two-dimensional Laplacian acting over the surface of the image. This equation has the following symbolic solution:

$$A = -k \nabla_\perp^{-2} \partial_z V. \quad (5)$$

If the gradient operator $\nabla_\perp$ is applied to both sides of this equation, it becomes:

$$\nabla_\perp A = -k \nabla_\perp \nabla_\perp^{-2} \partial_z V. \quad (6)$$

The defining equation (2) for the function A allows (6) to be transformed into:

$$I \nabla_\perp \phi = -k \nabla_\perp \nabla_\perp^{-2} \partial_z V. \quad (7)$$

Dividing both sides by I then yields:

$$\nabla_\perp \phi = -k I^{-1} \nabla_\perp \nabla_\perp^{-2} \partial_z V. \quad (8)$$

However, as is mentioned above, rather than dividing both sides by the intensity value I, a maximum focus value across all of the images could be used, or the variance data at the plane could be used, or a maximum variance across all of the variance state of values could be used.

Taking the two dimensional divergence $\nabla_\perp \cdot$ of both sides of (8), and again making use of the standard identity $\nabla_\perp \cdot \nabla_\perp = \nabla_\perp^2$, then (8) becomes:

$$\nabla_\perp^2 \phi = -k \nabla_\perp \cdot [I^{-1} \nabla_\perp \nabla_\perp^{-2} \partial_z V]. \tag{9}$$

This equation has the following symbolic solution:

$$\phi = -k \nabla_\perp^{-2}(\nabla_\perp \cdot [I^{-1} \nabla_\perp \nabla_\perp^{-2} \partial_z V]). \tag{10}$$

In order to implement a practical solution to equation (10), the following formulae are required. A suitably-well-behaved function f(x,y) may be written in the form of a two-dimensional Fourier integral:

$$f(x,y) = \int_{-\infty}^{\infty}\int_{-\infty}^{\infty} \hat{f}(k_x, k_y) e^{i(k_x x + k_y y)} dk_x dk_y. \tag{11}$$

The function $\hat{f}(k_x, k_y)$ is called the "Fourier transform" of f(x,y).

The x derivative of (11) yields:

$$\frac{\partial}{\partial x} f(x,y) = \int_{-\infty}^{\infty}\int_{-\infty}^{\infty} [ik_x \hat{f}(k_x, k_y)] e^{i(k_x x + k_y y)} dk_x dk_y. \tag{12}$$

Hence the Fourier transform of $$\frac{\partial}{\partial x} f(x,y)$$

is equal to the Fourier transform of f(x,y) multiplied by $ik_x$. Stated differently, $$\frac{\partial}{\partial x} = iF^{-1} k_x F,$$

where F denotes Fourier transformation and $F^{-1}$ denotes inverse Fourier transformation. Similar considerations apply to $$\frac{\partial}{\partial y} f(x,y).$$

If the Laplacian $$\nabla_\perp^2 = \frac{\partial^2}{\partial x^2} + \frac{\partial^2}{\partial y^2}$$

of (11) is obtained and similar reasoning applied, it follows that $\nabla_\perp^{-2} = -F^{-1} k_r^{-2} F$, where $k_r^2 = k_x^2 + k_y^2$. Thus:

$$\nabla_\perp^{-2} = -F^{-1} k_r^{-2} F, \tag{13}$$

$$\frac{\partial}{\partial x} = iF^{-1} k_x F,$$

-continued $$\frac{\partial}{\partial y} = iF^{-1} k_y F.$$

Here, F denotes Fourier transformation, $F^{-1}$ denotes inverse Fourier transformation, $(k_x, k_y)$ are the Fourier variables conjugate to (x,y), and $$k_r^2 = k_x^2 + k_y^2.$$

Equations (13) can be used to rewrite equation (10) in the form $$\phi = \phi^{(x)} + \phi^{(y)}, \begin{cases} \phi^{(x)} = F^{-1} k_r^{-2} k_x F I^{-1} F^{-1} k_x k_r^{-2} F\left[k \frac{\partial V}{\partial z}\right] \\ \phi^{(y)} = F^{-1} k_r^{-2} k_y F I^{-1} F^{-1} k_y k_r^{-2} F\left[k \frac{\partial V}{\partial z}\right] \end{cases} \tag{14}$$

In practice division by intensity is only performed if that intensity is greater than a certain threshold value (eg. 0.1% of the maximum value).

Division by $k_r$ does not take place at the point kr=0 of Fourier space;

instead multiplication by zero takes place at this point. This amounts to taking the Cauchy principal value of the integral operator $\nabla_\perp^{-2}$.

In order to quantitatively measure the phase of object it is necessary to incorporate some physical constants into the phase recovery algorithm given in Equation (14) relating to the experimental setup in use to quantify the variables $k_x$, $k_y$. This can be done by rewriting equation (14) in the following form suitable for implementation using a fast Fourier transform:

$$\phi = \phi_x + \phi_y,$$

$$\begin{cases} \phi_x = -\frac{2\pi}{\lambda \delta z} \frac{1}{(N\Delta x)^2} F^{-1} \frac{i}{i^2+j^2} F \frac{1}{I(x,y)} F^{-1} \frac{i}{i^2+j^2} F\{V_+ - V_-\} \\ \phi_y = -\frac{2\pi}{\lambda \delta z} \frac{1}{(N\Delta x)^2} F^{-1} \frac{j}{i^2+j^2} F \frac{1}{I(x,y)} F^{-1} \frac{j}{i^2+j^2} F\{V_+ - V_-\} \end{cases}$$

where $$i, j \in \left[\frac{-N}{2}, \frac{N}{2}\right]$$

index the frequent components of $F(V_+ - V_-)$ where the intensity derivative $\partial_z V(x,y)$ is obtained by subtracting two images $V_+$ and $V_-$ separated by a distance $\delta z$, i and j are the pixel numbers on the image, and using the fact that the Fourier space step size is given by $$\Delta k = \frac{1}{N\Delta x}$$

where the image is an N×N array of pixels of size $\Delta x$. Thus in addition to measuring the three intensity distributions it is necessary to know the pixel size $\Delta x$, defocus distance $\delta z$ and wavelength $\lambda$ in order to make a quantitative phase measurement. All of these quantities can be readily determined: the pixel size can be determined directly for example from the CCD detector geometry (in the case of direct imaging), or by existing techniques for calibrating the transverse distance scales (in the case of an imaging system), the defocus distance can be measured directly, and the spectral distribution of the illumination can be determined either by monochromating the incident field or by analysing the spectral distribution of the radiation using existing spectroscopic methods.

Figure 6:
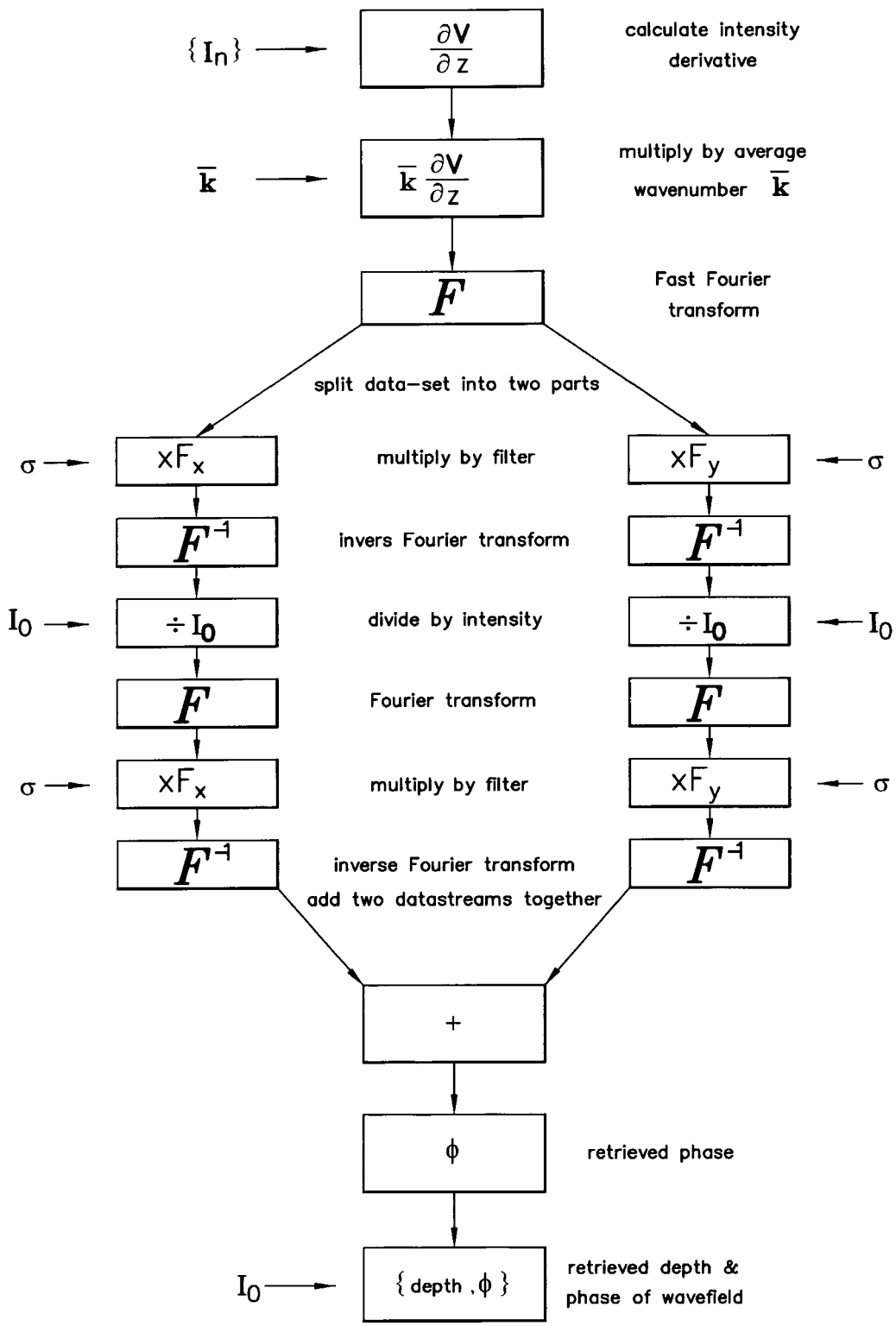
FIG. 6 is a flowchart showing an implementation of the method of the preferred embodiment.

An example of the phase-retrieval method implementing the solution of equation (14) can be represented by the flow-chart shown in FIG. 6. As shown in FIG. 2 the quantitative determination of phase of a radiation wave field proceeds from a set of variance measurements $\{V_n\}$ over the two spaced apart planes $V_-$ and $V_+$. A measurement of central intensity $I(x,y)$ in a selected plane parallel to and midway between the planes $V_-$ and $V_+$ is also obtained. The intensity measurements are performed over a defined array on each of the two planes A and B and the respective values subtracted to produce a measure of the intensity derivative. This value is multiplied by the negative of the average wave number. The data are split into two component sets and a fast Fourier transform is performed to produce the respective x and y components in the Fourier domain. A filter is then applied to the Fourier domain representations to correspond to the inversion of a differential operator reflected in the untransformed representation. An inverse Fourier transform is then performed on each of the x and y components to produce a spatial domain value from which the differential operator has been removed. A division by the central intensity $I(x,y)$ obtained by averaging the intensity measurements over planes $V_+$ and $V_-$ is then performed if the intensity level is above a selected threshold level. The resultant data is again Fourier transformed and multiplied by the same filter to again correspond to the inversion of a differential operator reflected in the untransformed data. The resultant components are again inverse Fourier transformed and summed to provide a retrieved phase measurement.

It will be apparent that in general the method according to this invention can proceed from any suitable representative determination of intensity derivative or rate of change of intensity over a selected surface extending across the propagation direction and the intensity over that same surface. As will be explained in various examples these data can be obtained in a variety of ways and the method implemented to yield phase of the radiation wave field.

Rewriting equation (14) with:

$$\Omega_x(k_x,k_y,\alpha)=k_x k_r^{-2}$$

$$\Omega_y(k_x,k_y,\alpha)=k_y k_r^{-2}$$

$$\phi(x,y)=\phi^{(x)}(x,y)+\phi^{(y)}(x,y),$$

gives $$\begin{cases} \phi^{(x)}(x,y) = F^{-1}\Omega_x(k_x,k_y,\alpha)F\frac{1}{I(x,y)}F^{-1}\Omega_x(k_x,k_y,\alpha)F\left[\overline{k}\frac{\partial V}{\partial z}\right]. \\ \phi^{(y)}(x,y) = F^{-1}\Omega_y(k_x,k_y,\alpha)F\frac{1}{I(x,y)}F^{-1}\Omega_y(k_x,k_y,\alpha)F\left[\overline{k}\frac{\partial V}{\partial z}\right] \end{cases} \quad (15)$$

where:
  $\phi(x,y)$ denotes the recovered phase,
  F denotes Fourier transformation, and $F^{-1}$ denotes inverse Fourier transformation, $I(x,y)$ is the intensity distribution over the plane of interest,
  $(x,y)$ are Cartesian coordinates over the plane of interest,
  $(k_x,k_y)$ are the Fourier variables conjugate to $(x,y)$
  $\overline{k}=2\pi/\overline{\lambda}$ is the average wave number of the radiation,
  $\overline{\lambda}$ is the average wavelength of the radiation,
  $\partial V/\partial z$ is the estimate for the longitudinal variance derivative,
  $\alpha$ is the regularization parameter used to stabilize the algorithm when noise is present.

As given above, the solution to the transport of intensity equation (1) assumes a perfect imaging system. That is, there are no "aberrations" present in the optical system used to obtain the intensity data which is fed into the algorithm. Of course, no imaging system is perfect. The imperfections present in an imaging system may be quantified by a set of numbers:

$$A_1, A_2, A_3, \quad (16)$$

which are termed aberration coefficients.

If intensity data were taken on an imperfect instrument whose imperfections were characterized by a certain set of known aberration coefficients $A_1, A_2, A_3, \ldots$, it would be desirable if the filters $\Omega_x(k_x,k_y,\alpha)$ and $\Omega_y(k_x,k_y,\alpha)$ present in (15) could be replaced by modified filters which explicitly depend upon the aberration coefficients:

$$\tilde{\Omega}_x(k_x,k_y,\alpha,A_1,A_2A_3,\ldots) \text{ and } \tilde{\Omega}_y(k_x,k_y,\alpha,A_1,A_2,A_3,\ldots) \quad (17)$$

This would allow the imperfections of the imaging system to be explicitly taken into account, leading to quantitatively correct phase retrieval using aberrated imaging systems. For the special case of a non-absorbing phase object in a radiation wave field of uniform intensity with weak (i.e. much less than $2\pi$ radians) phase variations the appropriate modified filters lead to the following functional form for the phase-retrieval algorithm:

$$\phi(x,y) = F^{-1}\left\{\frac{F\{V_{aberrated}(x,y)-1\}}{\left(\left(-2\pi\cdot\delta z\cdot\overline{\lambda}(k_x^2+k_y^2)-2\sum_m\sum_n A_{mn}k_x^m k_y^n\right)\right)}\right\}, \quad (18)$$

where:
  $V_{aberrated}(x,y)$ is the aberrated variance measured at defocus distance $\delta z$,
  $A_{mn}$ are the aberration coefficients which characterize the imperfect imaging system.
  If a filter is defined:

$$\tilde{\Omega}(k_x,k_y,\alpha,A_1,A_2,A_3,\ldots) = \frac{1}{\sqrt{-2\pi\cdot\delta z\cdot\overline{\lambda}(k_x^2+k_y^2)-2\sum_m\sum_n A_{mn}k_x^m k_y^n}} \quad (19)$$

Then (18) becomes:

$$\phi(x,y) = F^{-1}\tilde{\Omega}F\frac{1}{I_0}F^{-1}\tilde{\Omega}F\{I_{aberrated}(x,y)-1\} \quad (20)$$

The term $\{I_{aberrated}(x,y)-1\}$ is a measure of rate of change of intensity. $I_0$ intensity is a measurable constant for uniform intensity so that (20) is the same general form as (15). Consequently the special case of aberration can be dealt with by changing the filter in the general method described above. The x and y component filters $\Omega_x$ and $\Omega_y$ are given by $$\Omega_x = \Omega_y = \frac{1}{\sqrt{2}}\Omega \qquad (21)$$

Figure 7:
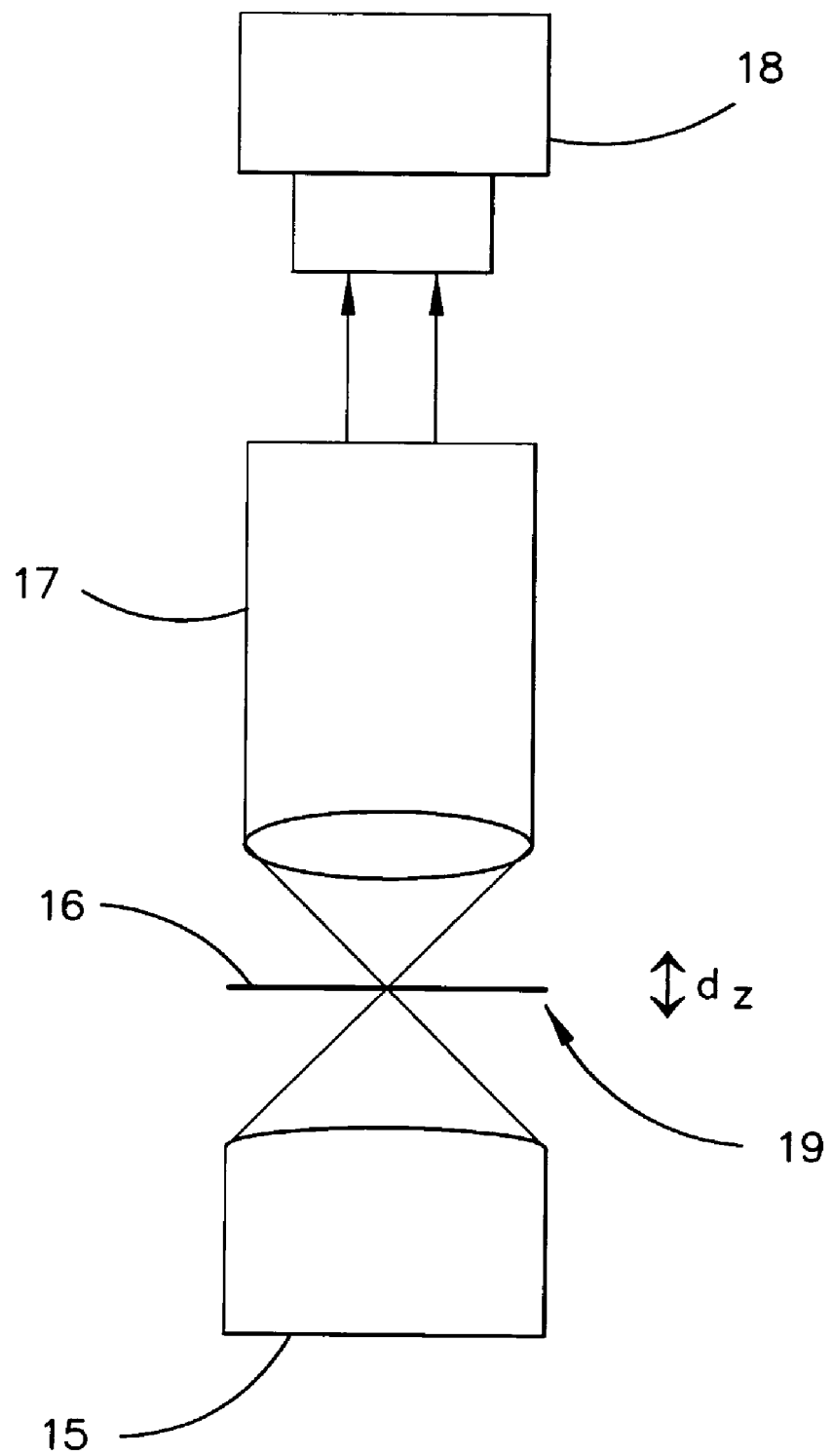
FIG. 7 is a schematic illustration of an arrangement which uses a microscope in the capture of images.

FIG. 7 schematically shows an arrangement for quantitative phase amplitude microscopy. A sample is illuminated using a source of white light Köhler illumination 15, commonly found on optical microscopes. The light is transmitted through an object 16 and collected by a microscope imaging system 17 and relayed to a CCD camera 18 or other digital imaging device having a planar imaging surface. Three images are collected: an in-focus image, $I_o$, and two slightly out of focus images $I_+$ and $I_-$. The defocus is obtained by suitable means such as a drive system 19 to adjust the microscope focus knob. The defocus introduced is usually quite small so that degradation in spatial resolution is minimised, although the optimal amount of defocus to use is determined by sample properties and imaging geometry such as magnification, numerical apertures, etc.

When taking the images the numerical aperture of the condenser is chosen to be less than the numerical aperture of the objective being used. If this is not the case then serious image degradation will occur, although the precise amount by which the condenser and objective numerical apertures should differ involves a tradeoff between image fidelity and spatial resolution, with the optimal difference depending on the sample properties and the optics used.

The variance data values are determined in the manner previously described from the intensity values collected at the planes $V_+$ and $V_-$ and are subtracted to produce a representative measure of rate of change of variance (variance derivative). From this and the intensity data of collected image $I_o$ the method described above can be used to produce quantitative information about the magnitude of the phase shift in the image plane.

There may be cases in which it is desirable to take more than two images in order to obtain a better estimate of the intensity derivative dV/dz. A function can then be fitted to this data from which dV/dz can be computed and used in the phase determination method in place of the simple subtraction of two images normally used.

It is also possible to operate this system in reflection geometry to obtain surface topography. The principle of operation is the same, however the optics have to be folded back on themselves to form a reflection geometry—otherwise the process is identical.

For certain applications it can also be desirable to filter the light to a particular wavelength, although this is not necessary for the described imaging process as it works equally well with white light.

Figure 8:
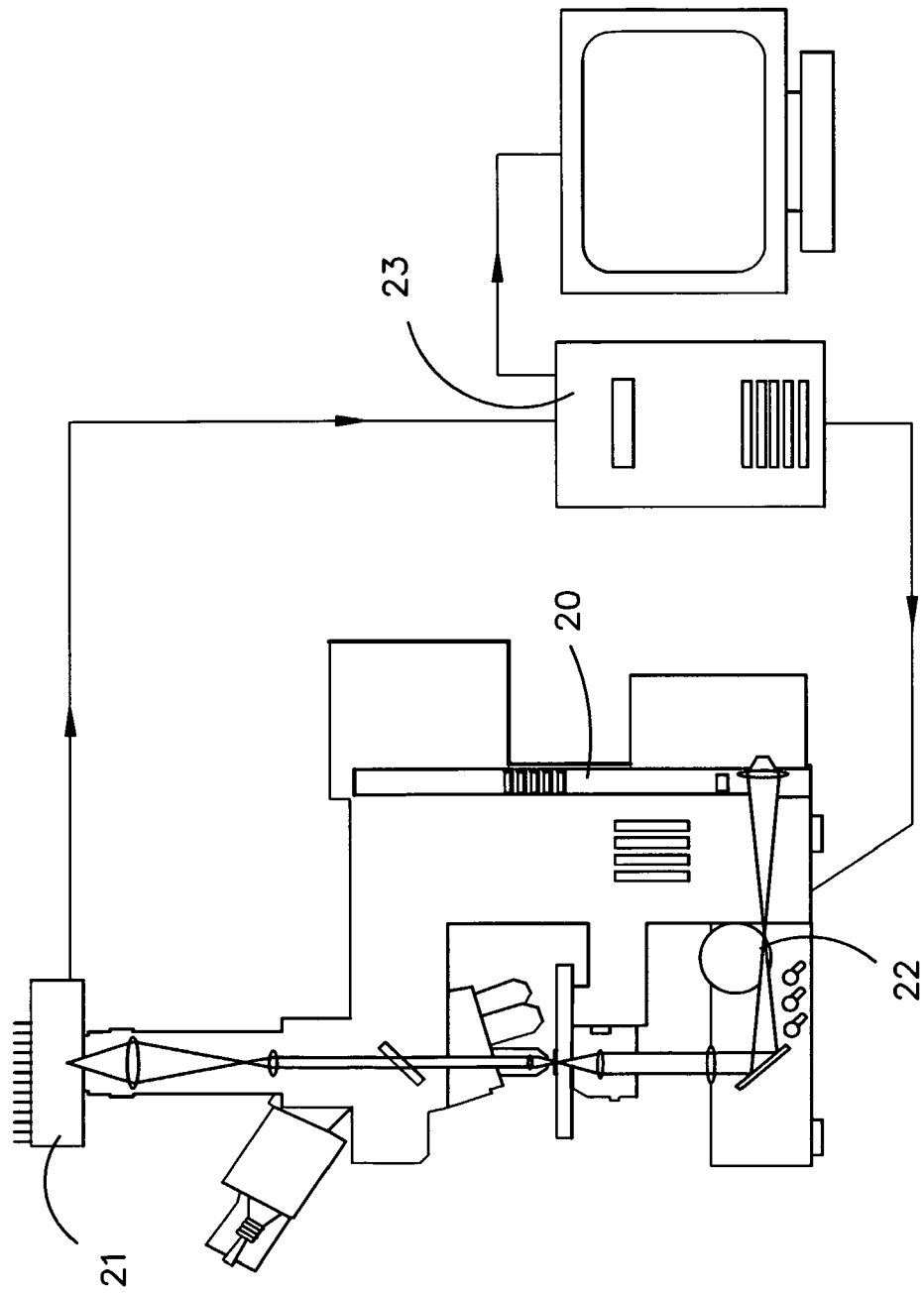
FIG. 8 is a schematic drawing of an exemplary system according to one embodiment of the invention.

An implementation is shown in FIG. 8. An Olympus BX-60 optical microscope 20 was equipped with a set of UMPlan metallurgical objectives and a universal condenser to provide Köhler illumination. In order to be able to compare the results with existing imaging modes Nomarski DIC optics and a set of cover-slip corrected UplanApo objectives were also acquired for this microscope, enabling images to be taken of the same field of view using both phase retrieval and Nomarski DIC for the purposes of qualitative comparison. A 12-bit scientific grade Photometrics SenSys CCD camera 21 equipped with a 1300×1035 pixel Kodak KAF-1400 CCD chip was added to the 0.5× video port on the microscope to acquire digital images of the sample.

The phase recovery technique of this embodiment of the invention requires the acquisition of defocused images. A stepper motor drive system 22 was attached to the focus knob of the microscope. This stepper motor 22 was attached to the parallel port of a 133 MHz Pentium PC 23 also used to control the CCD camera 21, enabling full automation of the acquisition of through-focus image sequences. This data acquisition system was linked to custom software written to recover phase images from the CCD images, thereby enabling full automation of the image acquisition and data processing sequences.

The form of the differential operators used in the preferred embodiment of this invention are based on the optics of the system used to obtain the above-mentioned images. Thus, the operator takes into account the details of the optical system used to take the images. This is achieved by:

Determine the numerical aperture of the condenser, $NA_{condensor}$

Determine NA of objective, $NA_{objective}$, and $\rho_{objective}$, the radius of the objective aperture $$\xi = \frac{NA_{condensor}}{NA_{objective}}$$

(These are settings and dimensions on the microscope.)

Determine radial lateral spatial frequency, $\rho$, and longitudinal spatial frequency, $\eta$.

(These are dependent on the pixelation and position distribution of images taken in the series.)

Determine the wavelength, $\lambda$, of the radiation to be used.

The new form of the operator is $$\frac{\sqrt{T_P}}{T_P + \alpha^2}$$

where, $$T_P(\rho) = 2\pi i \delta z \int \eta T_P^{(3)}(\rho, \eta) d\eta$$

and $$T_P^{(3)}(\rho, \eta) = \frac{i}{2\pi\rho} \left\{ \begin{array}{c} \left[\frac{\left[\frac{1}{2}\rho_{obj}^2(\xi^2+1) - \frac{1}{4}\rho^2 - \left(\frac{\eta}{\lambda\rho}\right)^2 - \right]^{1/2}}{\left|\frac{\eta}{\lambda} - \frac{1}{2}\rho_{obj}^2(\xi^2-1)\right|}\right] \\ -\left[\frac{\left[\frac{1}{2}\rho_{obj}^2(\xi^2+1) - \frac{1}{4}\rho^2 - \left(\frac{\eta}{\lambda\rho}\right)^2 - \right]^{1/2}}{\left|\frac{\eta}{\lambda} + \frac{1}{2}\rho_{obj}^2(\xi^2-1)\right|}\right] \end{array} \right\}$$

Figure 9:
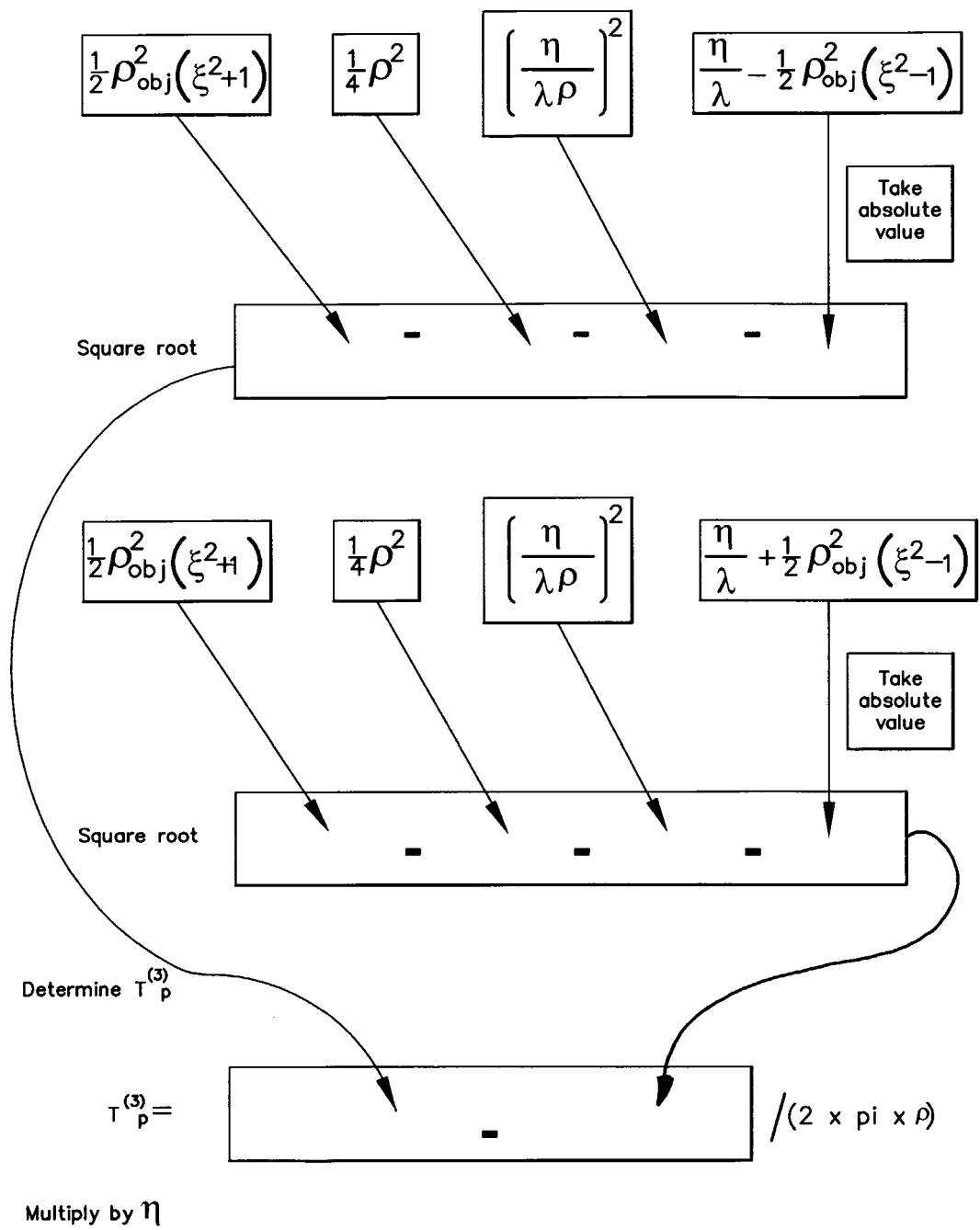
FIG. 9 is a flow chart relating to one embodiment of the invention.

FIG. 9 is a flow chart generally illustrating how $T_\rho$ is determined by means of the above equation merely showing breakdown of the various components of the equation.

The calculator depth image can then be presented in different modalities to give better visualisation. Such modalities including DIC, bright field images, dark field images and other conventional modality images. Techniques for forming these types of images from the phase data determined in accordance with the present invention are described in our copending International Application No. PCT/AU02/00590 (the contents of which is incorporated into this specification by this reference).

Since modifications within the spirit and scope of the invention may readily be effected by persons skilled within the art, it is to be understood that this invention is not limited to the particular embodiments described by way of example hereinabove.

In the claims which follow and in the preceding description of the invention, except where the context requires otherwise due to express language or necessary implication, the word "comprise", or variations such as "comprises" or "comprising", is used in an inclusive sense, ie. to specify the presence of the stated features but not to preclude the presence or addition of further features in various embodiments of the invention.

The invention claimed is:

1. A method of producing an image containing depth information, comprising:
   detecting a radiation wavefield emanating from the scene and taking at least two images of a scene at different planes relative to the scene to produce a first image comprised of a first set of intensity data values and a second image comprised of a second set of intensity data values;
   determining an intensity variation of data values in the first set of data values relative to other data values in the first set of data values to produce a first set of intensity variances, and determining an intensity variation of data values in the second set of values relative to other data values in the second set of values to produce a second set of intensity variance data;
   processing the first and second sets of intensity variance data to obtain image data of the scene containing depth information; and
   coding the image data which have the same depth information with a code reference to identify the different depth information in the image data.

2. The method of claim 1 wherein the step of processing the intensity variance data preferably comprises:
   (a) producing a representative measure of the rate of change of variance data values of said radiation wave field over a selected surface extending generally across the wave field;
   (b) producing a representative measure of said radiation wave field relating to the scene over said selected surface;
   (c) transforming said measure of rate of change of variance to produce a first integral transform representation and applying to said first integral transform representation a first filter corresponding to the inversion of a first differential operator reflected in said measure of rate of change of variance to produce a first modified integral transform representation;
   (d) applying an inverse of said first integral transform to said first modified integral transform representation to produce an untransformed representation;
   (e) applying a correction based on said measure over said selected surface to said untransformed representation;
   (f) transforming the corrected untransformed representation to produce a second integral transform representation and applying to said second integral transform representation a second filter corresponding to the inversion of a second differential operator reflected in the corrected untransformed representation to produce a second modified integral transform representation;
   (g) applying an inverse of said second integral transform to said second modified integral transform representation to produce a measure of phase of said radiation wave field across said selected plane so as to produce said image data as phase image data containing the depth information.

3. The method of claim 2 wherein step of producing a representative measure of said radiation wavefield relating to the scene over the selected surface may use intensity values to obtain the representative measure or variance values.

4. The method of claim 3 wherein intensity values at the selected surface are used.

5. The method of claim 3 wherein values are taken representing maximum focus from any of the intensity data values.

6. The method of claim 3 wherein variance data values are used as a representative measure.

7. The method of claim 3 wherein maximum variance values taken from the sets of variance data values are used.

8. The method of claim 1 wherein at least one of the first or second differential operator has a form based on an optical system used to acquire the radiation for producing the representative measure of the rate of change of variance of the radiation wavefield over the selected surface extending generally across the wavefield.

9. The method of claim 8 wherein both the first and second differential operators have a form based on the optical system.

10. The method of claim 2 wherein the first and second integral transforms are produced using a Fourier transform.

11. The method of claim 2 wherein the differential operators have the form:

$$\frac{\sqrt{T_P}}{T_P + \alpha^2}$$

where, $$T_P(\rho) = 2\pi i \delta z \int \eta T_P^{(3)}(\rho, \eta) d\eta$$

and $$T_P^{(3)}(\rho, \eta) = \frac{i}{2\pi\rho} \left\{ \begin{array}{c} \left[ \frac{1}{2}\rho_{obj}^2(\xi^2+1) - \frac{1}{4}\rho^2 - \left(\frac{\eta}{\lambda\rho}\right)^2 - \right]^{1/2} \\ \left| \frac{\eta}{\lambda} - \frac{1}{2}\rho_{obj}^2(\xi^2-1) \right| \\ -\left[ \frac{1}{2}\rho_{obj}^2(\xi^2+1) - \frac{1}{4}\rho^2 - \left(\frac{\eta}{\lambda\rho}\right)^2 - \right]^{1/2} \\ \left| \frac{\eta}{\lambda} + \frac{1}{2}\rho_{obj}^2(\xi^2-1) \right| \end{array} \right\}$$

and wherein ρ is radial lateral spatial frequency, the η longitudinal spatial frequency and δz is the defocus distance in the plane of the object. Also $$\xi = \frac{NA_{condensor}}{NA_{objective}}$$

where $NA_{condensor}$ and $NA_{objective}$ are respectively the numerical aperture of the condenser and the objective (These are settings and dimensions on the microscope). $\rho_{obj}$ is the maximum spatial frequency accepted by the objective.

12. The method of claim 1 wherein the step of taking at least two images of a scene comprises taking the first image at a first defocused plane to produce the first image as negatively focused image data and taking the second image of the scene at a second defocused plane to produce positive defocused image data, the negative and positive defocused image being taken on respective sides of a focal plane which would produce an in focus image of the scene.

13. The method of claim 1 wherein the step of determining an intensity variance comprises determining a measure of the sharpness of each of the data values relative to the sharpness of data values surrounding that data value.

14. The method of claim 1 wherein the images are captured by a charge coupled device and an intensity value of pixels in the image is determined, and that intensity value is compared with the intensity of surrounding pixels in order to provide a variance value at each pixel.

15. The method of claim 14 wherein the variance is obtained by the following equation for each pixel:

$$\text{var}_n = \frac{1}{8} \times \sqrt{\begin{aligned}&(I_n-I_2)^2+(I_n-I_4)^2+(I_n-I_8)^2+\\&(I_n-I_6)^2+\frac{1}{\sqrt{2}}(I_n-I_1)^2+\frac{1}{\sqrt{2}}+(I_n-I_3)^2+\\&\frac{1}{\sqrt{2}}(I_n-I_7)^2+\frac{1}{\sqrt{2}}(I_n-I_9)^2\end{aligned}}$$

wherein n is the particular pixel, and the values 1 to 9 represent the pixels which surround that pixel in an array of pixels.

16. The method of claim 1 wherein the step of coding parts of the image data comprises applying different colours to parts of the image which have the same depth information so as to produce a visual image in which the relative distance of parts of the scene compared to one another can be determined.

17. The method of claim 1 wherein a third image of the scene is taken at an in focus plane to produce a third set of intensity data values and the third set of intensity data values are overlaid with the coded image data to produce a visual image containing structural information of the scene as well as the different depth information in the scene.

18. The method of claim 15 wherein the different depth information is provided by allocating a grey scale value to pixel values in the image.

19. An apparatus for producing an image containing depth information comprising:

a camera for detecting a radiation wavefield emanating from a scene and taking at least two images of the scene at different planes relative to the scene to produce a first set of intensity data values and a second set of intensity data values;

a processor for determining an intensity variation of data values in the first set of data values compared to other data values in the first set of data values to produce a first set of variance data values, and for determining an intensity variation of data values in the second set of data values compared to other data values in the second set of data values to produce a second set of variance data values;

the processor also being for processing the first and second sets of variance data values to produce image data of the scene containing depth information; and the processor also being for coding parts of the image which have the same depth information with a code reference to identify the different depth information in the image.

20. The apparatus of claim 19 wherein the processor for determining an intensity variation is a processor for:

(a) producing a representative measure of the rate of change of variance data values of said radiation wave field over a selected surface extending generally across the wave field;

(b) producing a representative measure of said radiation wave field relating to the scene over said selected surface;

(c) transforming said measure of rate of change of variance to produce a first integral transform representation and applying to said first integral transform representation a first filter corresponding to the inversion of a first differential operator reflected in said measure of rate of change of variance to produce a first modified integral transform representation;

(d) applying an inverse of said first integral transform to said first modified integral transform representation to produce an untransformed representation;

(e) applying a correction based on said measure over said selected surface to said untransformed representation;

(f) transforming the corrected untransformed representation to produce a second integral transform representation and applying to said second integral transform representation a second filter corresponding to the inversion of a second differential operator reflected in the corrected untransformed representation to produce a second modified integral transform representation;

(g) applying an inverse of said second integral transform to said second modified integral transform representation to produce a measure of phase of said radiation wave field across said selected plane so as to produce said image data as phase image data containing the depth information.

21. The apparatus of claim 20 wherein at least one of the first or second differential operator has a form based on an optical system used to acquire the radiation for producing the representative measure of the rate of change of variance of the radiation wavefield over the selected surface extending generally across the wavefield.

22. The apparatus of claim 21 wherein both the first and second differential operators have a form based on the optical system.

23. The apparatus of claim 22 wherein the first and second integral transforms are produced using a Fourier transform.

24. The apparatus of claim 21 wherein the differential operators have the form:

$$\frac{\sqrt{T_P}}{T_P+\alpha^2}$$

where, $$T_P(\rho) = 2\pi i \delta z \int \eta T_P^{(3)}(\rho,\eta)d\eta$$

and $$T_P^{(3)}(\rho,\eta) = \frac{i}{2\pi\rho}\left\{\begin{aligned}&\frac{\left[\frac{1}{2}\rho_{obj}^2(\xi^2+1)-\frac{1}{4}\rho^2-\left(\frac{\eta}{\lambda\rho}\right)^2-\right]^{1/2}}{\left|\frac{\eta}{\lambda}-\frac{1}{2}\rho_{obj}^2(\xi^2-1)\right|}\\&-\frac{\left[\frac{1}{2}\rho_{obj}^2(\xi^2+1)-\frac{1}{4}\rho^2-\left(\frac{\eta}{\lambda\rho}\right)^2-\right]^{1/2}}{\left|\frac{\eta}{\lambda}+\frac{1}{2}\rho_{obj}^2(\xi^2-1)\right|}\end{aligned}\right\}$$

and wherein $\rho$ is radial lateral spatial frequency, the $\eta$ longitudinal spatial frequency and $\delta z$ is the defocus distance in the plane of the object. Also $$\xi = \frac{NA_{condensor}}{NA_{objective}}$$

where $NA_{condensor}$ and $NA_{objective}$ are respectively the numerical aperture of the condenser and the objective (These are settings and dimensions on a microscope, if a microscope is used in the capture of the various images by camera). $\rho_{obj}$ is the maximum spatial frequency accepted by the objective.

25. The apparatus of claim 19 wherein the images are captured by a charge coupled device and an intensity value of pixels in the image is determined, and that intensity value is compared with the intensity of surrounding pixels in order to provide a variance at each pixel.

26. The apparatus of claim 25 wherein the variance is obtained by the following equation for each pixel:

$$\text{var.}_n = \frac{1}{8} \times \sqrt{\begin{array}{c}(I_n - I_2)^2 + (I_n - I_4)^2 + (I_n - I_8)^2 + \\ (I_n - I_6)^2 + \frac{1}{\sqrt{2}}(I_n - I_1)^2 + \frac{1}{\sqrt{2}} + (I_n - I_3)^2 + \\ \frac{1}{\sqrt{2}}(I_n - I_7)^2 + \frac{1}{\sqrt{2}}(I_n - I_9)^2\end{array}}$$

wherein n is the particular pixel, and the values 1 to 9 represent the pixels which surround that pixel in an array of pixels and I is the intensity value of the respective pixel.

27. The apparatus of claim 26 wherein the processor is for applying different colours to parts of the image which have the same depth information so as to produce a visual image in which the relative distance of parts of the scene compared to one another can be determined.

28. The apparatus of claim 27 wherein the different depth information is provided by allocating a grey scale value to pixel values in the image.

* * * * *